Feb. 9, 1926.　　　　　　　　　　　　　　　　1,572,595
W. E. DUNSTON
BUMPER ATTACHING AND SUPPORTING MEANS
Filed May 8, 1923　　　2 Sheets-Sheet 2
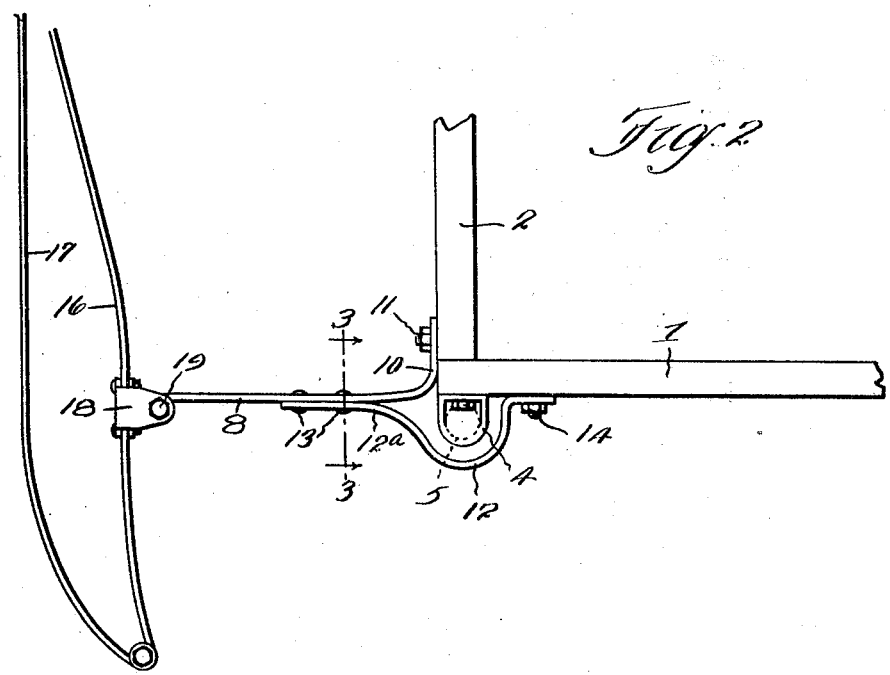
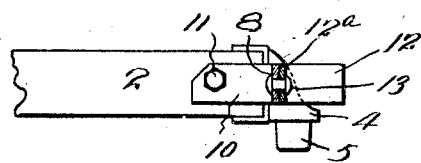
Inventor
Wayne E. Dunston,
By Hull, Brock & West
Attys.

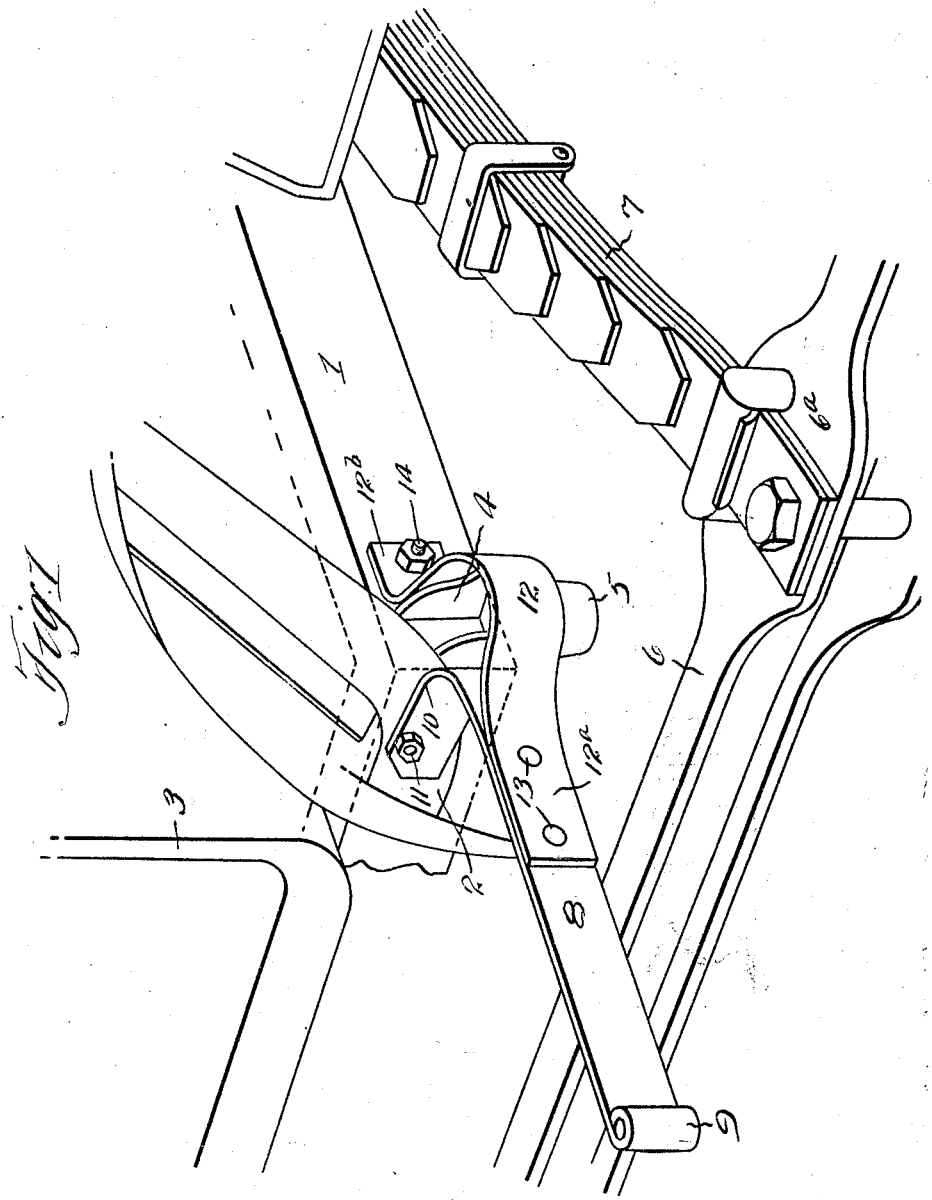

Patented Feb. 9, 1926.

1,572,595

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER ATTACHING AND SUPPORTING MEANS.

Application filed May 8, 1923. Serial No. 637,460.

*To all whom it may concern:*

Be it known that I, WAYNE E. DUNSTON, a citizen of the United States, residing at Detroit, in the county of Wayne and State of Michigan, have invented a certain new and useful Improvement in Bumper Attaching and Supporting Means, of which the following is a full, clear, and exact description, reference being had to the accompanying drawings.

This invention relates to means for supporting bumpers from the side members of automobiles, and has for its general object to provide for such bumpers a supporting means which is particularly adapted for a certain make or type of frame construction and which will enable the bumper to be supported in a convenient and efficient manner from such frame. I accomplish the foregoing objects in and through the construction and arrangement of parts shown in the drawings forming part hereof, wherein Fig. 1 represents a detail in perspective of the front of an automobile having my invention applied thereto; Fig. 2 a detail in plan of the frame and supporting arm, showing a portion of a bumper connected to the latter; and Fig. 3 a sectional elevation corresponding to the line 3—3 of Fig. 2.

In the form disclosed herein, my invention is particularly adapted to be applied to the frame of an automobile wherein the side members do not project beyond the front cross member and wherein the front end of each cross member is provided with a rubber buffer which is adapted to engage the axle under severe deflections of the springs. The bumper-supporting arms which I employ are constructed with special reference to a frame-installation of this kind and enable a bumper to be quickly and conveniently secured in place while affording a supporting means that is capable of withstanding all of the ordinary incidents of use.

In the drawings, 1 denotes the front end of one of the side frame members and 2 the front cross member of an automobile, the radiator being indicated at 3. Secured to the front end of each side member 1 is a bracket 4 which supports a rubber buffer 5 that is adapted to engage the axle 6 thereeneath, under sufficient deflection of the springs, one of the springs being indicated at 7, the spring being a fore-and-aft spring having its front end secured upon a springseat 6ª on top of the axle 6.

8 denotes the main body of the bumper supporting arm, the same being provided at its front or outer end with an eye 9 and having its rear end bent inwardly and substantially at right angles therefrom, as indicated at 10, in order to abut against the front face of the cross member 2, to which it may be secured in any convenient manner, as by means of one or more bolts 11.

In order to give proper strength and rigidity to the bumper supporting arm, I provide the same with a rearward extension, in the shape of a plate 12, the front end 12ª of said plate being riveted or otherwise secured to the body of the arm 8, as indicated at 13. The central or main part of this plate is bent outwardly to clear the bracket 4 and the rubber buffer 5, the rear end of the plate being bent inwardly and then rearwardly to provide a rear end portion 12ᵇ which is adapted to abut against the web of the member 1 and to be secured thereto, as by one or more bolts 14.

The front end of the arm 8 is shown as connected to the rear bar 16 of the bumper, the front or impact bar of which is indicated at 17. The connection as shown includes a clamp 18 which is mounted upon the rear bar and a bolt 19 pivotally connecting the said clamp to the eye 9 at the front end of the arm.

Having thus described my invention, what I claim is:

1. The combination, with a cross member and a side member of a vehicle frame, of a buffer-supporting bracket adjacent to the junction of said members, and a bumper supporting member comprising an arm having a lateral projection adapted to engage and to be secured to the cross member and a second arm extending rearwardly from the first mentioned arm and projected outwardly and inwardly to provide a bracket-receiving recess, the second arm being extended beyond such bracket and provided with a portion adapted to engage and to be attached to the said side member.

2. The combination, with a cross member and a side member of a vehicle frame, of a bracket projecting outwardly from said member, an arm having its outer end adapted for attachment to a bumper and having its inner end projected laterally from the body portion of such arm for attachment to said cross member, and an extension secured to said arm and projecting beyond the inner end of said arm and beyond said bracket and having its inner end adapted for attachment to said side member, the said extension being offset between its inner end and its point of attachment to said arm, thereby to extend about said bracket.

In testimony whereof, I hereunto affix my signature.

WAYNE E. DUNSTON.